US005374672A

United States Patent [19]

Chaverot et al.

[11] Patent Number: 5,374,672

[45] Date of Patent: Dec. 20, 1994

[54] METHOD FOR PRODUCING AN ASPHALT BINDER EMULSION WHICH MAKES IT POSSIBLE TO CONTROL THE VISCOSITY AND BREAKING PROPERTIES OF THE EMULSION

[75] Inventors: Pierre Chaverot, Oullins; Francis Demangeon, Dardilly; Régis Vincent, Grigny, all of France

[73] Assignee: Koch Materials Company, Wichita, Kans.

[21] Appl. No.: 108,559

[22] PCT Filed: Dec. 21, 1992

[86] PCT No.: PCT/FR92/01211

§ 371 Date: Aug. 23, 1993

§ 102(e) Date: Aug. 23, 1993

[87] PCT Pub. No.: WO93/12873

PCT Pub. Date: Jul. 8, 1993

[30] Foreign Application Priority Data

Dec. 23, 1991 [FR] France ................................ 91 15956

[51] Int. Cl.[5] .............................................. C08L 95/00

[52] U.S. Cl. ........................................ 524/60; 524/68; 524/69; 524/71; 524/59; 422/258; 422/259

[58] Field of Search .................. 422/258, 259; 524/60, 524/68, 69, 70, 71, 59

[56] References Cited

U.S. PATENT DOCUMENTS

| | | | |
|---|---|---|---|
| 3,127,367 | 3/1964 | Endres et al. | 422/259 |
| 4,314,921 | 2/1982 | Biegenzein | 524/68 |
| 4,722,953 | 2/1988 | DeRuiter et al. | 524/60 |

FOREIGN PATENT DOCUMENTS 1103301 3/1961 Germany .

*Primary Examiner*—Peter Szekely

*Attorney, Agent, or Firm*—Burgess, Ryan and Wayne

[57] ABSTRACT

The invention relates to a method for producing an aqueous asphalt binder emulsion which makes it possible to control the viscosity and breaking properties of the emulsion.

22 Claims, 2 Drawing Sheets

Figure 1:
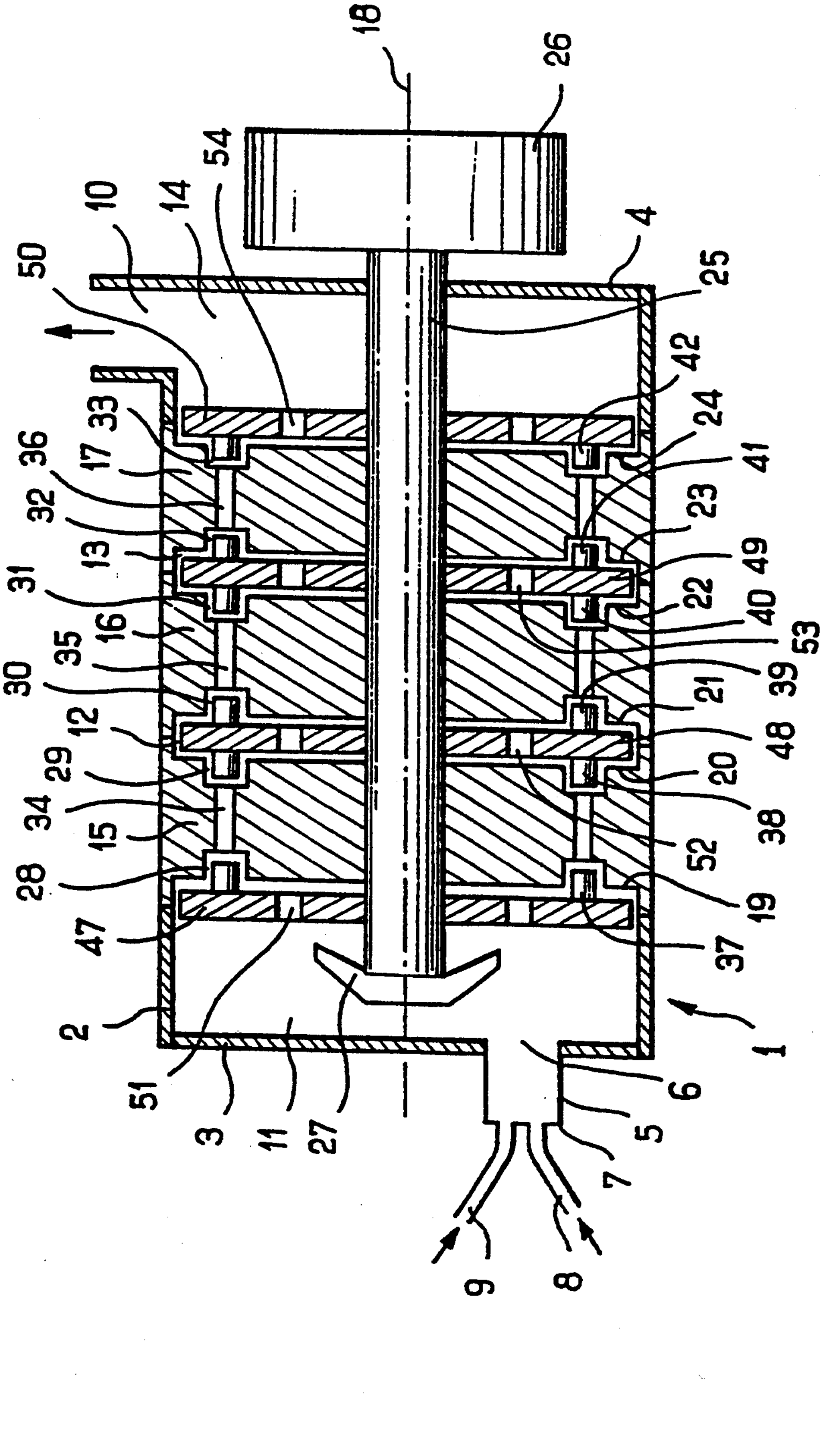

METHOD FOR PRODUCING AN ASPHALT BINDER EMULSION WHICH MAKES IT POSSIBLE TO CONTROL THE VISCOSITY AND BREAKING PROPERTIES OF THE EMULSION

The invention relates to a method for producing an aqueous asphalt binder emulsion which makes it possible to control the viscosity and breaking properties of the emulsion.

The use of aqueous asphalt binder emulsions in the construction and repair of roads, for the paving of roadways, soil stabilization, for leakproofing in civil engineering or in buildings or for analogous applications is well known. The aqueous emulsions which are suitable for these applications are emulsions of the "oil-in-water" type, which consist of a dispersion of an organic phase formed of fine globules of asphalt binder in a continuous aqueous phase, the aqueous phase containing an emulsifying system, which favours the dispersion of the globules of the asphalt binder in the aqueous phase and consists of one or a number of emulsifying agents, and optionally a pH-regulating agent, which can be, depending on the case, an acid, a water-soluble salt or a base. Such emulsions, whose organic phase content is commonly between 60 and 75% by weight, are commonly classified according to the nature of the emulsifying system used to provide dispersion of the asphalt binder in the aqueous phase and depending on whether the emulsifying system consists of one or a number of anionic, cationic, nonionic or amphoteric emulsifying agents, the corresponding emulsions will be respectively called anionic, cationic, nonionic or amphoteric.

The aqueous emulsion of the asphalt binder is regarded as a convenient means for making it possible to reduce the apparent viscosity of the binder during operations of use of this asphalt binder. After breaking, the emulsion restores the asphalt binder, containing a part of the emulsifying system and other additives present in the aqueous phase.

The aqueous asphalt binder emulsions used for the production of impregnation layers, of holding-down layers or yet again of sealing coats require entirely different viscosity levels depending upon the use concerned. For impregnation layers, the emulsion must have a sufficiently low viscosity to be able to enter as deeply as possible into the structure to be stabilized before breaking of the emulsion takes place which brings about release of the binder. In the case of a holding-down layer or of a sealing coat, the emulsion must, on the other hand, have a sufficiently high viscosity for the slope of the ground, on which this emulsion is spread, not to bring about the formation of run-outs, which have the double disadvantage of simultaneously bringing about local underchargings of asphalt binder and an overcharging or smears at other spots.

The increase in the viscosity of the emulsions is the solution generally adopted for minimizing the run-out problems. The viscosity increase can be achieved either by addition of thickening substances to the aqueous phase, or by adjustment of the manufacturing parameters of the emulsion in order to control the mean size and the particle-size distribution of the globules of asphalt binder which it contains or yet again by the expedient of an increase in the binder content of the emulsion. In particular, the aqueous emulsion containing 80% by weight or more of asphalt binder should make it possible to solve the problems of run-outs at conventional proportions and for uses requiring a greater emulsion proportion as is the case, for example, for monolayer coats. Parallel to this technical aspect, the aqueous emulsion containing 80% by weight or more of asphalt binder also has an advantage at the economic level, because it makes it possible to transport more active material (asphalt binder) for the same amount of emulsion, this aspect acting favourably to reduce the transportation costs as far as the building site.

The emulsification of hydrocarbon binders is generally carried out by conveying, to an emulsifying chamber of colloid mill or turbine type, on the one hand, an asphalt binder in the form of a molten mass having a temperature between 80° C. and 180° C., and preferably between 110° C. and 160° C., and, on the other hand, an aqueous phase containing an emulsifying system or at least one of its components, the remainder being present in the asphalt binder, and optionally an agent for adjusting the pH of the emulsion and having a temperature between 10° C. and 90° C., and preferably between 20° C. and 80° C., and the whole is maintained in the said chamber for a time sufficient to form the emulsion.

The emulsifying chambers of colloidal mill or turbine type which are used for emulsifying asphalt binders are, for the most part, rotor/stator devices of cone/cone or disc/disc type with smooth or grooved surfaces. The rotor (mobile part of the device) and the stator (stationary part of the device) are separated by a very narrow air-gap, namely between several tenths of a millimetre and several millimetres, which provides shearing and brings about the dispersion of the asphalt binder in the form of separated globules in the continuous medium consisting of the aqueous phase.

In the case of the aqueous emulsification of asphalt binders consisting of asphalts modified by polymers and especially of asphalts modified by in-situ crosslinking of styrene/butadiene/styrene block copolymers, the use of emulsifying devices of the abovementioned type leads to the production of emulsions having too tow viscosities and it is necessary to carry out certain adjustments in the internal architecture of the said devices in order to overcome this disadvantage. Thus, the rotor and the stator, generally covered with channels or completely deprived of surface roughness, of the said devices were replaced by rotors and stators possessing these two characteristics, such an architecture being said to contain non-opening channels.

Moreover, the manufacture of the aqueous emulsions containing 80% by weight or more of asphalt binder by resorting to such emulsifying devices leads to a very fine particle-size distribution of asphalt binder globules dispersed in the continuous aqueous phase, which results in a very high viscosity of the emulsion produced. This viscosity increase brings about the progressive blocking of the tubular exchangers during the manufacture of such emulsions. In fact, emulsions containing 80% by weight or more of asphalt binder must be manufactured at a temperature greater than 100° C. This assumes that the emulsifying chamber is maintained under pressure in order to prevent boiling of the water of the aqueous phase of the emulsion. Before its departure at atmospheric pressure, the emulsion produced must be cooled by using a heat exchanger, generally tubular. The heat exchange phenomenon between the emulsion and the walls of the tubular exchanger is greatly limited by the high apparent viscosity of the emulsion with, as a consequence, risk of breaking of the emulsion in the exchanger and asphalt binder deposition on the walls of the said exchanger with, as a result, blocking of the latter. Moreover, the application of such an emulsion results in very significant combing and inequalities in transverse charging due to the excessively high viscosity of the emulsion which results in a very small distance between the spreading nozzles. Additionally, as a result of phase inversions which take place prior to normal breaking of the emulsion after its spreading, water remains imprisoned in the residual asphalt binder film. This water brings about a significant reduction in the cohesion of the asphalt binder immediately after spreading and can lead to detachments as a result of expansion of water under the effect of frost.

It has now been found that, by using a specific emulsifying chamber of the dynamic mixer type, it was possible to produce viscous aqueous emulsions containing a low asphalt binder content or even to reduce the viscosity of aqueous emulsions containing a high asphalt binder content (80% by weight or more) by simple adjustment of the viscosity parameters of the fluids in the chamber, which makes it possible to provide reliability of production on a building site. This adjustment can be carried out, among others, by controlling the temperature of these fluids at the inlet of the chamber.

More precisely, by resorting to the specific emulsifying chamber, it is possible to produce an aqueous emulsion containing a high asphalt binder content (especially 80% and more) with a much lower viscosity than the emulsion obtained under the same conditions with a conventional emulsifying chamber of the cone/cone or disc/disc type. Moreover, the use of an asphalt binder at a lower temperature makes it possible substantially to increase the viscosity of an aqueous emulsion which will be too fluid under the usual conditions of production as is the case especially for aqueous emulsions in which the asphalt binder content is between 60% and 75% by weight.

Moreover, by using the emulsifying chamber according to the invention, an aqueous emulsion obtained from an asphalt or from an asphalt modified by in-situ cross-linking of a styrene/butadiene/styrene block copolymer has a particle-size distribution of the asphalt binder globules having a mean size substantially greater than that of an aqueous emulsion obtained under analogous conditions with an emulsifying chamber of cone/cone or disc/disc type.

Another advantage of the use of the specific emulsifying chamber according to the invention is that it leads to the production of aqueous asphalt binder emulsions having much more straightforward breaking without imprisonment of water inside the asphalt binder. By this expedient, for example, an emulsion containing 80% by weight of asphalt binder behaves exactly as an emulsion containing 70% by weight of asphalt binder would behave which, during its breaking, would already have lost 10 points of water as a result of the evaporation of the latter during the spreading of the emulsion. There is therefore no discontinuity between an emulsion containing a low concentration, for example of the order of 60%, of asphalt binder during evaporation on the roadway and an emulsion containing a high concentration, for example 80% by weight and more, of asphalt binder, by virtue of the use of the emulsifying chamber according to the invention.

The process according to the invention for the production of an aqueous asphalt binder emulsion which makes it possible to control the viscosity and breaking properties of the emulsion is of the type in which the processing is carried out in an emulsifying chamber having an inlet and an outlet separated by a series of shearing zones of the rotor/stator type arranged in series and each consisting of at least one circular groove which is formed in one face of a stationary element, rigidly connected to the wall of the chamber and acting as stator, and into which enters a series of projections each having, in cross-section through a plane containing the axis of the groove, a shape complementary to that of the corresponding cross-section of the groove, so as to define, between each projection and the groove, a space forming an air-gap, the said projections being rigidly connected to one of the faces of a support disc acting as rotor centred on the axis of the groove and rotationally mobile around the axis, which disc is traversed by orifices arranged between the axis of the groove and the projections, the grooves of two consecutive shearing zones being arranged so as to be either formed in the opposite faces of the same stator element and connected via channels connecting their respective bottoms, or formed in the facing faces of two consecutive stator elements and then separated by a support disc carrying projections on its two faces, and it is characterized in that there is injected into the emulsifying chamber, via its inlet, an asphalt binder in the form of a molten mass having a temperature between 80° C. and 180° C., and preferably between 110° C. and 160° C., and an aqueous phase, which contains an emulsifying system or at least one of it components, the remainder of the emulsifying system then being present in the asphalt binder, and optionally an agent for adjusting the pH of the emulsion and which has a temperature between 10° C. and 90° C., and preferably between 20° C. and 80° C., the combined asphalt binder and aqueous phase are made to pass into the successive shearing zones whose air-gaps have a thickness ranging from 0.1 mm to 5 mm, and more particularly from 0.2 mm to 2 mm, by imposing a rotational speed on the rotor discs carrying the projections such that their peripheral speed is between 4 and 18 m/s and preferably between 10 and 15 m/s.

Preferably, the asphalt binder and the aqueous phase are premixed before passing into the first shearing zone of the emulsifying chamber.

The respective amounts of asphalt binder and aqueous phase used to form the emulsion are advantageously such that the ratio of the flow rate, by mass, of the asphalt binder to the flow rate, by mass, of the aqueous phase, which are conveyed to the premixing or injected simultaneously and separately into the emulsifying chamber, is from 50:50 to 90:10 and preferably from 55:45 to 85:15.

Advantageously, the channels connecting the respective bottoms of the consecutive grooves, which are formed in the opposite faces of the same stator element, have a cross-section having a surface area greater than that of the orifices passing through the disc carrying projections associated with each groove.

The use of the emulsifying chamber according to the invention makes it possible to adjust the viscosity of an emulsion containing a given concentration of asphalt binder produced by the chamber by simply adjusting the value, chosen in the ranges defined above, of the temperature of the asphalt binder and of the aqueous phase, or of their premixture, at the inlet of this chamber, the viscosity of the emulsion being higher, all the other conditions being moreover equal, as the said inlet temperature is lower.

The asphalt binder, which is converted into an aqueous emulsion by the process according to the invention, has a kinematic viscosity at 100° C. advantageously between $0.5\times10^{-4}$ m²/s and $3\times10^{-2}$ m²/s and preferably between $1\times10^{-4}$ m²/s and $2\times10^{-2}$ m²/s.

The asphalt binder can consist of an asphalt or of a mixture of asphalts having a kinematic viscosity within the abovementioned ranges, which asphalt or mixture of asphalts can be chosen from straight-run distillation asphalt or asphalt from distillation under reduced pressure or again from oxidized or semi-oxidized asphalts, indeed even from certain petroleum cuts or mixtures of asphalts and vacuum distillates. The asphalt binder which can be used according to the invention can also consist of a composition of the asphalt/polymer type, which composition can be any one of the products obtained from asphalts to which one or a number of polymers have been added, and which are optionally modified by reaction with this or these polymers, if needs be in the presence of a coupling agent chosen, for example, from elemental sulphur, polysulphides of hydrocarbons, sulphur-donating vulcanization accelerators, or mixtures of such products with each other and/or with non-sulphur-donating vulcanization accelerators. In the composition of asphalt/polymer type, obtained in the presence or in the absence of a coupling agent, the amount of polymer generally represents 0.5% to 15%, and preferably 0.7% to 10%, of the asphalt weight. The polymers capable of being present in the asphalt/polymer composition can be chosen from various polymers which are combined with the asphalts in the asphalt/polymer compositions. The polymers can be, for example, elastomers such as polyisoprene, butyl rubber, polybutene, polyisobutene, polyacrylates, polymethacrylates, polynorbornene, ethylene/propylene copolymers, ethylene/propylene/diene terpolymers (EPDM terpolymers), or even fluorinated polymers such as polytetrafluoroethylene, silicone polymers such as polysiloxanes, copolymers of olefins and vinyl monomers, such as ethylene/vinyl acetate copolymers, ethylene/acrylic ester copolymers, ethylene/vinyl chloride copolymers, and polymers of the poly(vinyl alcohol), polyamide, polyester or even polyurethane type. Advantageously, the polymer present in the asphalt/polymer composition is chosen from statistical or sequenced copolymers of styrene and a conjugated diene, because these copolymers dissolve very easily in the asphalts and confer excellent mechanical and dynamic properties, and especially very good viscoelasticity properties, on the latter. In particular, the copolymer of styrene and a conjugated diene is chosen from the sequenced copolymers of styrene and butadiene, of styrene and isoprene, of styrene and chloroprene, of styrene and carboxylated butadiene and of styrene and carboxylated isoprene. The copolymer of styrene and a conjugated diene, and in particular each of the sequenced copolymers mentioned above, advantageously has a content, by weight, of styrene ranging from 5% to 50% by weight. The mean viscosimetric molecular mass of the copolymer of styrene and a conjugated diene, and especially that of the copolymers mentioned above, can be, for example, between 10,000 and 600,000, and preferably lies between 30,000 and 400,000. Preferably, the copolymer of styrene and a conjugated diene is chosen from the di- or trisequenced copolymers of styrene and butadiene, of styrene and isoprene, of styrene and carboxylated butadiene or else of styrene and carboxylated isoprene, which have styrene contents and molecular masses lying within the ranges defined above.

The asphalt/polymer composition can further contain 1 to 40%, and more particularly 2 to 20%, by weight of the asphalt, of a fluxing agent, which can consist, especially, of a hydrocarbon oil having a distillation range at atmospheric pressure, determined according to ASTM standard D 86-67, between 100° C. and 450° C. and more especially situated between 150° C. and 380° C. Such a hydrocarbon oil can be, for example, a petroleum cut of aromatic nature, a petroleum cut of naphtheno/aromatic nature, a petroleum cut of naphtheno/paraffinic nature, a petroleum cut of paraffinic nature, a coal oil or even an oil of plant origin.

The asphalt/polymer composition having the required viscosity can be obtained by simple mixing of the appropriate amount of elastomeric polymer within the range defined above with the asphalt chosen, for its part, to have a viscosity compatible with the viscosity of the asphalt/polymer composition to be produced.

The asphalt/polymer composition can alternatively be produced by mixing, first of all, the polymer with the asphalt as shown above and then by incorporating, in the said mixture, a sulphur-donating coupling agent in an amount suitable for providing an amount of elemental or radical sulphur representing 0.5% to 10%, and more particularly 1% to 8%, of the weight of the polymer used to produce the asphalt/polymer composition and by maintaining the whole mixture with stirring at a temperature between 100° C. and 230° C., for example corresponding to the temperature at which the polymer is brought into contact with the asphalt, for a period of time sufficient to form an asphalt/polymer composition having the desired viscosity and for which the polymer is fixed to the asphalt. The sulphur-donating coupling agent can be chosen, especially, from elemental sulphur, polysulphides of hydrocarbons, as described in Citation FR-A-2,528,439, and the vulcanization systems containing vulcanization accelerators as described in Citation EP-A-0,360,656.

When an asphalt/polymer composition is used which contains a fluxing agent, the latter can be added to the medium, which is constituted as indicated above from the asphalt, the polymer and optionally the coupling agent, at any time during the formation of the said medium, the amount of fluxing agent being chosen to be compatible with the final desired use on the building site. In such an embodiment of the asphalt/polymer composition using a fluxing agent and a sulphur-donating coupling agent, the polymer and the said coupling agent are incorporated in the asphalt in the form of a mother solution of these products in the fluxing agent and in particular in the hydrocarbon oil defined above as capable of constituting the fluxing agent. The mother solution can be prepared by bringing into contact the ingredients composing it, namely fluxing agent, polymer and coupling agent at temperatures between 10° C. and 140° C. and for a time sufficient to produce complete dissolution of the polymer and of the coupling agent in the fluxing agent. The respective concentrations of the polymer and of the coupling agent in the mother solution can vary fairly widely depending especially on the nature of the fluxing agent used to dissolve the polymer and the coupling agent.

To prepare the asphalt/polymer composition by using the mother solution, the mother solution of the polymer and of the coupling agent in the fluxing agent is mixed with the asphalt in the molten state, with stirring, and then the resulting mixture is maintained, in the molten state and with stirring, for a period of time sufficient to produce a fluid product with a continuous appearance and with a viscosity compatible with the final use on the building site.

The asphalt/polymer composition can further contain various additives and especially nitrogen-containing compounds of amine or amide type as promoters of adhesion of the final asphalt/polymer binder to inorganic surfaces, the said nitrogen-containing compounds being, preferably, grafted onto the asphalt/polymer component and in particular onto the polymeric chains of the said composition.

Immediately before it is brought into contact with the aqueous phase, the asphalt binder of the asphalt/polymer composition type, obtained or not obtained in the presence of the coupling agent, can also have a sulphur-donating vulcanization system added to it or, if appropriate, can have added to it the components of such a system which form the said system in situ, at a concentration suitable for providing an amount of sulphur representing 0.5 to 20%, and preferably 1 to 15%, of the weight of the polymer present in the asphalt/polymer composition. The sulphur-donating vulcanization system can be chosen, among others, from the products shown above as capable of constituting the coupling agent used for producing certain asphalt/polymer compositions. By carrying out the reaction thus, an aqueous asphalt/polymer binder emulsion is obtained in which the polymer of the said binder is at least partially crosslinked in a three-dimensional structure.

The aqueous phase, which is employed in the implementation of the process according to the invention, consists of water containing an emulsifying system in an effective amount, that is to say an amount suitable for enabling dispersion of the globules of the asphalt binder in the aqueous phase and for preventing reagglomeration of the dispersed globules. The amount of emulsifying system is generally chosen to represent 0.05% to 5%, and preferably 0.1% to 2%, of the total weight of the emulsion .

The emulsifying system present in the aqueous phase of the emulsion can be of cationic, anionic, nonionic or even amphoteric nature. An emulsifying system of cationic nature, which gives birth to a cationic emulsion, contains 1 or a number of cationic emulsifying agents which can advantageously be chosen from nitrogen-containing cationic emulsifying agents such as fatty monoamines, polyamines, amidoamines, amidopolyamines, salts or oxides of the said amines and amidoamines, reaction products of the abovementioned compounds with ethylene oxide and/or propylene oxide, imadazolines and quaternary ammonium salts. In particular, the emulsifying system of cationic nature can be formed by the combination of one or a number of cationic emulsifying agents A chosen from the cationic nitrogen-containing emulsifying agents of the types of the monoamines, diamines, amidoamines, oxides of such amines or amidoamines, reaction products of such compounds with ethylene oxide and/or propylene oxide and quaternary ammonium salts, with one or a number of emulsifying agents B chosen from cationic nitrogen-containing emulsifying agents having, in their molecule, at least three functional groups chosen from amine and amide groups so that one at least of the functional groups is an amine group, the ratio of the amount, by weight, of the compound(s) A to the total amount, by weight, of the compounds A and B ranging in particular from 5% to 95%. An emulsifying system of anionic nature, which gives birth to an anionic emulsion, contains one or a number of anionic emulsifying agents which can be chosen especially from the alkali metal or ammonium salts of fatty acids, alkali metal polyalkoxycarboxylates, alkali metal N-acyl sarcosinates, alkali metal hydrocarbyl sulphonates and especially sodium alkyl sulphonates, sodium aryl sulphonates and sodium alkyl aryl sulphonates, sodium alkyl arenesulphonates, sodium lignosulphonates, sodium dialkyl sulphosuccinates and sodium alkyl sulphates. It is also possible to use an emulsifying system of nonionic nature formed from one or a number of nonionic emulsifying agents which can be especially chosen from ethoxylated fatty alcohols, ethoxylated fatty acids, sorbitan esters, ethoxylated sorbitan esters, ethoxylated alkylphenols, ethoxylated fatty amides and the fatty acid esters of glycerol. Further, it is possible to use an emulsifying system of amphoteric nature formed from one or a number of amphoteric emulsifying agents which can be chosen, for example, from betaines and amphoteric imidazolinium derivatives. It is also possible to use an emulsifying system consisting of a mixture of emulsifying agents of different natures, for example a mixture of one or a number of anionic or cationic emulsifying agents with one or a number of nonionic and/or amphoteric emulsifying agents. For more details on emulsifying agents capable of constituting emulsifying systems which can be used according to the invention, reference may be made to the Kirk-Othmer handbook entitled Encyclopedia of Chemical Technology, Third Edition, Volume 22, pages 347 to 360 (anionic emulsifying agents), pages 360 to 377 (nonionic emulsifying agents), pages 377 to 384 (cationic emulsifying agents) and pages 384 to 387 (amphoteric emulsifying agents).

If need be, it is possible further to incorporate in the aqueous phase an agent intended to adjust the pH of the emulsion to the desired value. The said agent can be an acid, for example an inorganic acid such as HCl, $HNO_3$ or $H_3PO_4$ or a saturated or unsaturated mono- or polycarboxylic acid such as acetic acid, formic acid, oxalic acid or citric acid, when the value of the pH of the emulsion has to be lowered, or else a base or a basic salt, especially an inorganic base consisting of an alkali metal hydroxide such as sodium hydroxide or of an alkaline-earth oxide or hydroxide, when the value of the pH of the emulsion has to be increased.

Besides the emulsifying system and the optional agent for the adjustment of the pH, the aqueous phase can further contain various additives such as, for example, complexing agents for metal ions as described in Citations FR-A-2,577,545 and FR-A-2,577,546.

To prepare the aqueous phase, which is brought into contact with the asphalt binder in the emulsifying chamber, the emulsifying system and the other optional ingredients, especially agent for adjusting the pH and complexing agent, are incorporated with the amount of water necessary for the production of the desired emulsion, which amount of water is brought beforehand to a temperature between 10° C. and 90° C. and preferably between 20° C. and 80° C. The amount of emulsifying system added to the water is chosen so that the concentration of the said emulsifying system in the final emulsion is within the range defined above. When other ingredients, especially agent for adjustment of the pH, complexing agent for metal ions or others, have to be incorporated in the aqueous phase, the respective amounts of the said ingredients are those used commonly for this purpose.

For example, the aqueous phase for producing an anionic emulsion can be prepared as follows. In water, maintained at a temperature between 10° C. and 90° C. and more particularly between 20° C. and 80° C., there is dissolved or dispersed, the reaction being carried out with stirring, the appropriate amount of a precursor of emulsifying agent of anionic type consisting of an acid or polyacid containing a saturated or partially unsaturated, or also partially cyclic, aliphatic chain. A concentrated NaOH or KOH solution is then added to the solution or suspension obtained until neutralization of the acid and formation of the corresponding salt which constitutes the anionic emulsifying agent. The pH of the emulsion can range between 7 and 13 and more especially between 9 and 11. The concentration of acidic precursor in aqueous phase is chosen to represent between 0.02% and 2% of the weight of the final emulsion according to the use of the emulsion on the roadway.

When it is desired to form a cationic emulsion, the aqueous phase can, for example, be prepared as follows. In water, maintained at a temperature between 10° C. and 90° C. and more particularly between 20° C. and 80° C., there is dispersed an appropriate amount of one or a number of cationic emulsifying agents, for example of the type of fatty amines or polyethylene polyamines containing fatty chains, and then there is added to the dispersion thus obtained a sufficient amount of an inorganic acid or of an organic monocarboxylic or polycarboxylic acid to produce a final pH between 1 and 7 and preferably between 2 and 5. The concentration of cationic emulsifying agent(s) in the aqueous phase is chosen to represent 0.2 to 2% of the weight of the final cationic emulsion.

When, in one or the other of the preparation examples given above, additives such as complexing agents for metal ions, adhesiveness agents or others are used, these additives are added to the aqueous phase at any time during the preparation of the latter and in any order.

When the asphalt binder is at a temperature which leads, after contact with the aqueous phase, to a temperature greater than the boiling temperature of the water, the circuit must be maintained under a pressure sufficient to prevent boiling of the water. In this case, the emulsion discharged from the emulsifying chamber must be cooled, for example in an air or water heat exchanger, to a temperature below 100° C. before being brought back to atmospheric pressure in order to be directed towards the final storage or alternatively in order to be charged directly into a spreading lorry.

The asphalt binder emulsion obtained by the process according to the invention can be used for the production of pavements and especially of road pavements of the sealing coat type, for the production of surfacings put in place while hot or while cold, or alternatively for the production of leakproof surfacings.

With a view to use as a sealing coat, there is chosen, as emulsifying agent of the aqueous phase, an emulsifying agent which makes possible rapid breaking of the emulsion, which brings about the restoration of an asphalt binder which adheres both to the roadway and to the aggregates.

If the final goal for the use of the emulsion is the emplacement of a surfacing, it is possible to operate either while cold by spreading the aggregate/emulsion mixture prepared in a surfacing plant using a road-finishing machine, followed by compacting the mixture with smooth-wheel rollers or/and with multityred rollers, or while hot by mixing the emulsion with hot aggregates until the water has completely evaporated, followed by spreading the coating prepared in a surfacing plant using a road-finishing machine, then compacting the said coating with smooth-wheel rollers or/and multityred rollers.

The emulsion obtained by the process according to the invention can also be introduced while hot into a surfacing plant where the aggregates, heated and dried beforehand, are mixed with the said emulsion, which brings about evaporation of the water present in the emulsion under the effect of the heat.

The emulsion prepared by the process according to the invention can alternatively be used in the cold mastic surfacing technique. In this case, the composition of the aqueous phase is adapted, as is known in the art, to make it possible for the slurry to break after it has been mixed and spread over the roadway.

Figure 1A:
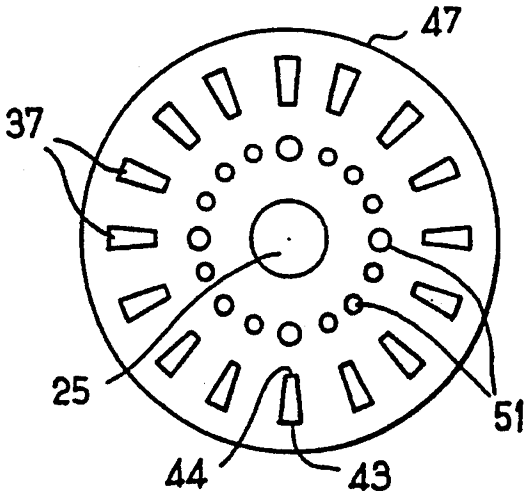
Figure 1B:
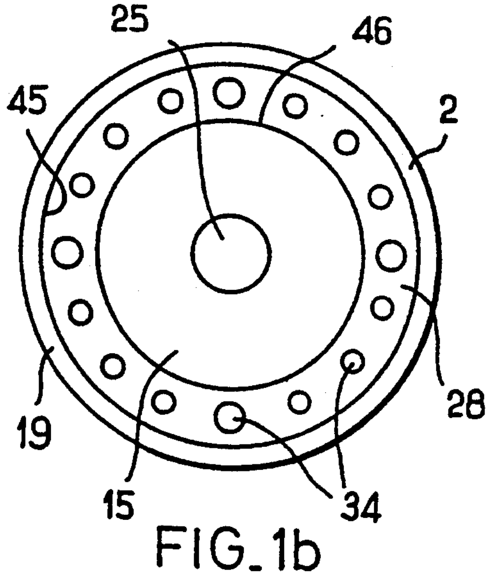
Figure 2A:
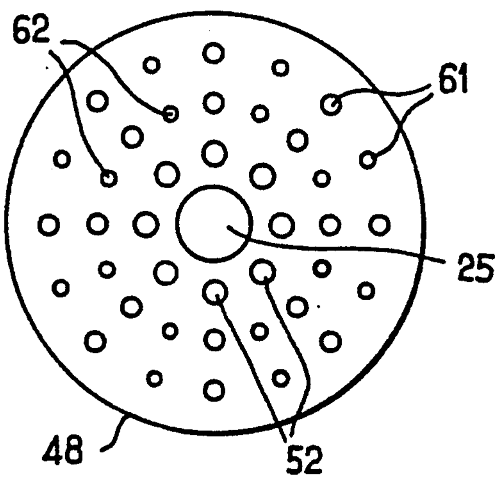
Figure 2C:
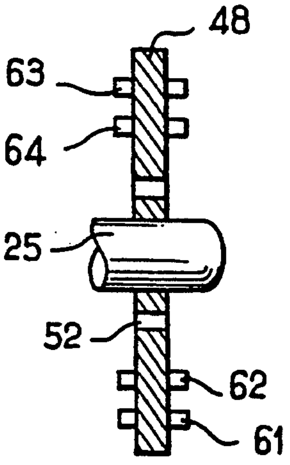
Figure 2B:
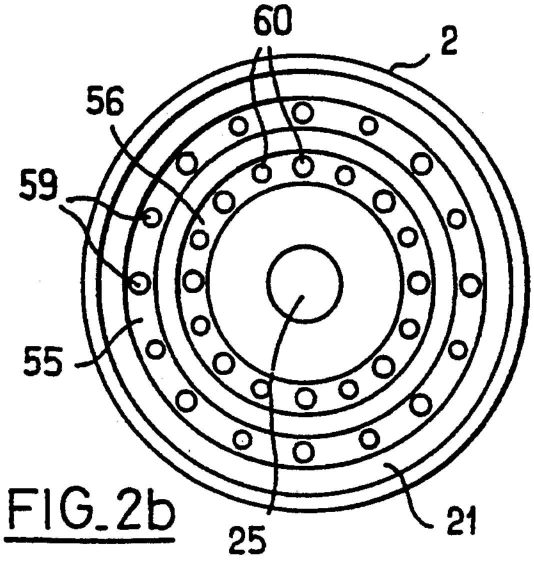
Figure 2D:
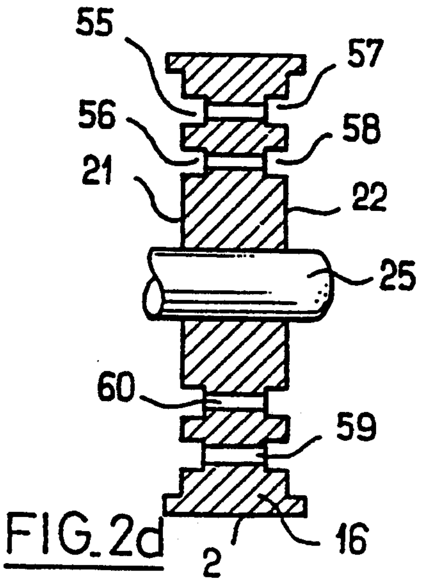

Other characteristics and advantages of the invention will become further apparent when reading the following description of an embodiment of the said invention given with reference to the appended drawing, in which:

FIG. 1 represents a longitudinal schematic cross-section of an emulsifying chamber according to the invention containing an integral premixer, whereas FIGS. 1*a* and 1*b* show the facing faces of a rotor disc equipped with projections and of the grooved stator element which form a shearing zone of the said chamber; and FIGS. 2*a* and 2*b* show schematically a variant of the facing faces of a rotor disc equipped with projections (FIG. 2*a*) and of the associated grooved stator element (FIG. 2*b*), which form a shearing zone of the emulsifying chamber, whereas FIGS. 2*c* and 2*d* are cross-sections through a radial plane respectively of the said rotor and of the said stator element.

The emulsifying chamber according to the invention containing an integral premixer, which is represented schematically in FIGS. 1, 1*a* and 1*b*, is formed of a chamber 1 delimited by a cylindrical side wall 2 having a front end closed by a wall 3 and a rear end closed by a wall 4. The wall 3 is provided with a pipe 5 forming an inlet pipe, which opens into the chamber 1 via one of its ends 6 and is divided at its other end 7 into two pipes, namely a pipe 8 for supplying an asphalt binder in the molten state and a pipe 9 for supplying an aqueous phase. In the neighbourhood of its rear wall 4, the chamber i is provided with a pipe 10 forming an outlet pipe and arranged to emerge radially or tangentially in the said chamber. The chamber 1 is divided into compartments, four in number in this case numbered 11 to 14, by partitions, three in number in this case numbered 15 to 17, the said partitions, of identical structures, being rigidly connected to the side wall 2 of the chamber 1 and each being delimited by two parallel plane faces which are perpendicular to the longitudinal axis 18 of the cylindrical chamber 1, namely faces 19 and 20 for the partition 15, faces 21 and 22 for the partition 16 and faces 23 and 24 for the partition 17, the said partitions 15 to 17 acting as stator elements. The partitions 15 to 17 are arranged so that, in the chamber 1, the end compartments 11 and 14 have a sufficient width to constitute respectively a premixing compartment 11 for the emulsion precursors which are the asphalt binder and the aqueous phase and a compartment 14 for collecting the emulsion and so that the intermediate compartments 12 and 13 have a very small width. The inlet pipe 5 emerges in the premixing compartment 11, whereas the outlet pipe 10 opens into the compartment 14 for collecting the emulsion. A shaft 25, whose axis coincides with the axis 18 of the chamber 1, passes through, in a leaktight way, the rear wall 4 of the chamber 1 as well as each of the stator elements 15 to 17 and has an end situated outside the chamber 1 on the side of the wall 4, the said end being connected to a motor 26 capable of driving the shaft 25 in rotation, and an end which terminates in an element 27 arranged to act as stirrer and situated in the premixing compartment 11. On each of the faces of each stator element is formed a circular groove with an axis coinciding with the longitudinal axis 18 of the chamber 1, namely grooves 28 and 29 respectively for faces 19 and 20 of the stator element 15, grooves 30 and 31 for the faces 21 and 22 of the stator element 16 and grooves 32 and 33 for the faces 23 and 24 of the stator element 17, the said grooves having the same mean diameter, width and depth. The grooves belonging to the same stator element are connected, bottom to bottom, by channels formed in the said stator element, namely channels 34 for the stator element 15, channels 35 for the stator element 16 and channels 36 for the stator element 17. A series of projections in the form of blades enters into each of the grooves, namely series 37 to 42 corresponding respectively to grooves 28 to 33. The blades associated with each groove, for example blades of the series 37 associated with the groove 28 as shown in FIG. 1*a*, each have, in this example, in cross-section through a plane perpendicular to the axis of the groove, a trapeziform having curvilinear parallel sides 43 and 44 concentric with the side walls 45 and 46 of the associated groove and, in cross-section through a median plane containing the axis of the groove, a form complementary to the cross-section of the said groove through this plane so as to define, between each blade and groove, a space forming an air-gap having a thickness within the ranges defined above. The blades of the same series of blades are rigidly connected to one of the parallel faces of a support disc acting as rotor element. The different series of blades 37 to 42 are carried, in the diagram represented, by four discs 47 to 50, namely disc 47 situated in the compartment 11 and carrying, on one face, the series of blades 37 entering into the groove 28 formed in the face 19 of the stator element 15, disc 48 situated in the intermediate compartment 12 and carrying, on one of its faces, the series of blades 38 entering into the groove 29 formed in the face 20 of the stator element 15 and, on the other face, the series of blades 39 entering into the groove 30 formed in the face 21 of the stator element 16, disc 49 situated in the intermediate compartment 13 and carrying, on one of its faces, the series of blades 40 entering into the groove 31 formed in the face 22 of the stator element 16 and, on the other face, the series of blades 41 entering into the groove 32 formed in the face 23 of the stator element 17 and finally disc 50 situated in the compartment 14 for collecting the emulsion and carrying, on a single face, the series of blades 42 entering into the groove 33 formed in the face 24 of the stator element 17. Each disc, which has an axis coinciding with the axis 18 of the chamber 1 so that its parallel faces are parallel to the faces of the associated stator element, is mounted, for example by a nonrepresented keying system, on the shaft 25 so as to be rigidly connected to the latter and, for this reason, to be driven in rotation by the shaft when the latter is rotated by the motor 26. Each disc is traversed by orifices made in the disc between the shaft 25 and the series of blades carried by the disc, namely orifices 51 for the disc 47, orifices 52 for the disc 48, orifices 53 for the disc 49 and orifices 54 for the disc 50, the orifices advantageously having a cross-section whose surface area is less than the cross-section of the channels made into the stator elements in order to connect, bottom to bottom, two grooves which each stator element contains. The discs 47 to 50 have a diameter slightly less, for example less by 0.2 mm to 1 mm, than the internal diameter of the cylindrical chamber 1. Additionally, each grooved face of any one of the stator elements 15 to 17 is separated from the facing face of the associated disc provided with blades entering into the groove by a space having a low thickness, for example a thickness ranging from 0.1 mm to 5 mm and preferably from 0.2 mm to 2 mm. The thickness of each of the compartments 12 and 13 is thus slightly greater, for example greater by 0.2 mm to 10 mm and preferably from 0.4 mm to 4 mm, than the thickness of the disc present in the compartment concerned. The space between the grooved face of any one of the stator elements 15 to 17 and the facing face of the associated disc equipped with blades entering into the groove thus defines a shearing zone. The emulsifying chamber represented schematically in FIG. 1 contains six shearing zones mounted in series. The grooves of two consecutive shearing zones are either formed in the opposite faces of the same stator element and connected by channels connecting their respective bottoms, or formed in the facing faces of two consecutive stator elements which are then separated by a perforated disc through which they are in communication.

In the variant, as shown diagrammatically in FIGS. 2*a* to 2*d*, on the one hand, each of the faces of any one of the stator elements 15 to 17 is provided with two concentric grooves, so that, to each groove present on one of the faces of the said any stator element, corresponds an identical groove on the other face of this element, these corresponding grooves being connected, bottom to bottom, via channels made in the said stator element and, on the other hand, each face of any disc 47 to 50, which faces a doubly grooved face of a stator element 15 to 17, carries two concentric series of projections, for example cylindrical, so that the projections of a series enter into one of the grooves of the doubly grooved face so as to define, with this groove, a space acting as air-gap as shown in the case of the blades of the system in FIG. 1. For example, as shown diagrammatically in FIGS. 2*b* and 2*d*, each of the faces 21 and 22 of the stator element 16 are provided with two concentric grooves 55 and 56 on the face 21 and with two corresponding concentric grooves 57 and 58 on the face 22, the grooves 55 and 57 being connected, bottom to bottom, via channels 59 and the grooves 56 and 58 being connected, bottom to bottom, via channels 60, which channels 59 and 60 are made in the said stator element 16, whereas, for example, as shown diagrammatically in FIGS. 2*a* and 2*c*, one of the faces of the disc 48, forming a rotor element and traversed by orifices 52, is provided with two concentric series of cylindrical projections 61 and 62, the first entering into the groove 55 of the stator element 16 and the second into the groove 56 of the said element, and the other face of the disc 48 is also provided with two concentric series 63 and 64 of cylindrical projections arranged to correspond to two grooves formed in the face 20 of the stator element 15.

The emulsifying chamber containing an integral premixer described above operates as follows.

The aqueous emulsion precursors, namely asphalt binder in the molten state and aqueous phase, conveyed respectively via pipes 8 and 9 and then via the pipe 5, enter into the compartment 11 in which the precursors are subjected to the action of the stirrer element driven in rotation by the shaft 25 powered by the motor 26 and are thus premixed. The premixture thus prepared then passes into the successive shearing zones, which are each formed by the space between the grooved face of a stator element and the facing face provided with projections belonging to the associated rotor element and which are connected in series either through the orifices traversing a rotor element or through the channels connecting, via their respective bottoms, the opposite grooves of the same stator element. In each of the said shearing zones, the medium formed from the asphalt binder in the molten state and from the aqueous phase is subjected to the action of shearing forces created by the rotation of the rotor element driven by the shaft 25 powered by the motor 26 and by the resulting movement of the projections rigidly connected to the rotor element in the groove associated with the stator element, which contributes to dividing the asphalt binder into globules and to dispersing these globules in the aqueous phase to produce the emulsion. The emulsion produced exits from the last shearing zone through the orifices 54 of the last rotor element 48 and is found in the collecting compartment 14, from where it is discharged continuously via the outlet pipe 10 to be directed towards a storage zone or towards a use point.

In order to complete the description which has been given of the invention, there are presented below, as non-limiting, concrete examples of the use of the said invention. In these examples, the amounts are given by weight except when otherwise indicated.

EXAMPLE 1

Preparation of aqueous asphalt/polymer asphalt binder emulsions

Two cationic emulsions were prepared, namely a control Emulsion A and an Emulsion B according to the invention, containing 80% by weight of an asphalt binder of asphalt/polymer type consisting of the product of reaction at high temperature of a road asphalt, with a penetration of 80/100, with a mother solution consisting of a solution of sulphur and of a sequenced styrene and butadiene copolymer containing, by weight, 25% of styrene and 75% of butadiene in a petroleum cut obtained in the refinery and called "Light Cycle Oil", the said cut having a distillation range of the order of 180° C. to 360° C.

Preparation of the asphalt binder 247 parts by weight of the sequenced copolymer were dissolved in 745 parts of the petroleum cut, while operating at a temperature between 80° C. and 100° C.. After complete dissolution of the polymer, 8 parts of sulphur were added to the solution. Eleven parts of the solution thus prepared were mixed with 89 parts of road asphalt and the mixture was brought to a temperature of between 170° C. and 180° C. for approximately 1.5 hours. An asphalt/polymer asphalt binder was thus obtained whose main characteristics are shown below:

Viscosity at 160° C.: 110 mPa.s

Pseudoviscosity at 50° C. with a 10 mm orifice (NF T 66005): 415 seconds

Tensile test at 0° C. with a speed of 500 mm/minute

Threshold stress ($\overline{V}t$): $7.7\times10^5$ Pa

Breaking stress ($\overline{V}b$): $1\times10^5$ Pa

Elongation at breaking ($\epsilon b$): >900%

Preparation of the aqueous phase:

9 parts of a mixture of cationic emulsifying agents consisting, by weight, of 10% tallow 1,3-propylenediamine (emulsifying agent of type A) and of 90% of a tallow polypropylenediamine (emulsifying agent of type B) were dispersed in 1000 parts of water brought to 60° C. and then 5.75 parts of 20° Bé HCl were added to the dispersion obtained and the whole was stirred until a clear liquid was obtained.

Preparation of control Emulsion A:

800 parts of the asphalt/polymer asphalt binder at 160° C. and 200 parts of aqueous phase at 60° C. were introduced jointly and continuously, with an overall flow rate of 150 kg/hour, into a conventional colloid mill consisting of a concentric stator and a concentric rotor of frustoconical shape having a large diameter equal to 50 mm and an air-gap (space between the facing side surfaces of the rotor and the stator) having a thickness of 0.3 mm. The emulsifying mill was maintained under pressure to prevent boiling of the water of the medium subjected to emulsifying, the temperature of which was approximately 125° C. and the speed of rotation of the rotor was fixed at 6000 revolutions/minute, which corresponds to a peripheral speed of the rotor of approximately 15 m/s.

The aqueous emulsion emerging from the colloid mill was subjected to a first cooling by passing into a tubular exchanger and then to a decompression at atmospheric pressure, after which the decompressed emulsion was cooled to room temperature over a period of approximately six hours to avoid any thermal shock.

Preparation of Emulsion B according to the invention:

The operation was carried out in a colloid mill analogous to that shown diagrammatically in FIG. 1 and for which, in operation, the shaft 25 was driven by the motor 26 with a rotational speed of 3600 revolutions/-minute, which communicated a peripheral speed of approximately 13.6 m/s to each of the rotor elements 47 to 50, whose diameter was equal to 7.2 cm. The peripheral speed of the rotor element, expressed in m/s is equal to $\pi$DN, D representing the diameter of the rotor element in m and N the rotational speed of the shaft 26 carrying the rotor, expressed in revolution/second. For each shearing zone, the space forming the air-gap between the projections and the walls of the groove, defined as shown above in the description, and the space between the face carrying the projections of the rotor element and the facing face of the associated stator element had a thickness equal to 0.4 mm.

80 parts of the asphalt binder, prepared as shown above and having a temperature of 160° C., were introduced continuously into the colloid mill via the pipe 8 and, simultaneously, 20 parts of the aqueous phase obtained as described above and having a temperature of 60° C. were introduced continuously into the colloid mill via the pipe 9, with an overall flow rate of 300 kg/hour. The colloid mill was maintained under pressure to prevent boiling of the water of the medium subjected to emulsification, the temperature of which was equal to approximately 125° C.

The aqueous emulsion emerging from the colloid mill was subjected to a first cooling by passing into a tubular exchanger, then to a decompression to atmospheric pressure, after which the decompressed emulsion was cooled to room temperature over a period of approximately six hours to avoid any thermal shock.

To assess the qualities of control Emulsion A and of Emulsion B according to the invention, their following characteristics were determined:

binder content determined according to NF standard T 66 017 and expressed in percentage by weight;

pH breaking index with sand determined according to NF standard T 66 017 at 20° C. and 5° C. and expressed in g of sand per 100 g of emulsion;

STY pseudoviscosity at 25° C. determined according to NF standard T 66 020 and expressed in s; and mean diameter of the asphalt binder globules determined from a particle-size distribution obtained by laser light scattering by using an apparatus marketed under the name Cilas 715.

The various characteristics measured are collated in Table I below.

TABLE I

| Emulsion | A (Control) | B (Invention) |
|---|---|---|
| Binder content (% by weight) | 80 | 80 |
| pH | 4.37 | 4.3 |
| Breaking index at 20° C. (g/100 g) | 42*) | 32 |
| Breaking index at 5° C. (g/100 g) | 53*) | 30 |
| STV Pseudoviscosity at 25° C. (s) | 400**) | 170 |
| Mean diameter of the globules (μm) | 7.2 | 30 |

*)doubtful measurement owing to the excessively high viscosity of the emulsion which makes it difficult to determine the breaking point and solidification point of the granular mixture (sand + binder).
**)as a result of the very high viscosity of the emulsion, the flow is not regular and takes place in noncontinuous waves.

Comparison of the results which appear in Table I reveal that the viscosity of an aqueous emulsion containing 80% by weight of asphalt binder obtained by using a conventional colloid mill (Emulsion A) is much greater than that of the comparable aqueous emulsion obtained by resorting to the process according to the invention. As a result of its very high viscosity, it is virtually impossible to use Emulsion A containing 80% of asphalt binder. On the other hand, the emulsion according to the invention containing a comparable content of asphalt binder (Emulsion B) has a viscosity which still makes it possible to use the emulsion.

EXAMPLE 2

Preparation of aqueous asphalt/polymer asphalt binder emulsions containing the same binder content and with different viscosities by adjustment of the temperature Two aqueous Emulsions C and D were prepared according to the invention containing 80% by weight of the asphalt/polymer binder of Example 1, the operation being carried out as described in the preparation of Emulsion B of the said example with, however, the following modifications:

in the preparation of Emulsion C, the aqueous phase was conveyed, via the pipe 9, with a temperature of 80° C. and the asphalt binder was conveyed, via the pipe 8, with a temperature of 110° C., which led to a temperature of approximately 100° C. for the medium subjected to emulsification in the emulsifying chamber and to the production of a high viscosity emulsion;

in the preparation of Emulsion D, the aqueous phase was conveyed, via the pipe 9, with a temperature of 80° C. and the asphalt binder was conveyed, via the pipe 8, with a temperature of 160° C., which led to a temperature of approximately 140° C. for the medium subjected to emulsification in the emulsifying chamber and to the production of a low viscosity emulsion.

The characteristics of the emulsions obtained are presented in Table II below.

TABLE II

| Emulsion according to the invention | C | D |
|---|---|---|
| Emulsification temperature | 100° C. | 140° C. |
| pH | 4.3 | 4.3 |
| Breaking index at 20° C. (g/100 g) | 38*) | 32 |
| Breaking index at 5° C. (g/100 g) | 45*) | 30 |
| STV Pseudoviscosity at 25° C. (s) | 330**) | 170 |
| Mean diameter of the globules (μm) | 5.6 | 30 |
| Binding content (weight %) | 80 | 80 |

*)doubtful measurement owing to the excessively high viscosity of the emulsion which makes it difficult to determine the breaking point and solidification point of the granular mixture (sand + binder).
**)as a result of the high viscosity of the emulsion, the flow is not regular and takes place in noncontinuous waves.

Comparison of the results which appear in Table II emphasizes that for the same content of asphalt binder, adjustment of the temperature at the inlet of the emulsifying chamber according to the invention makes it possible to control the final viscosity of the emulsion produced, this viscosity becoming lower as the said temperature becomes higher.

EXAMPLE 3

Preparation of an aqueous asphalt/polymer asphalt binder emulsion containing a low binder content and having a high viscosity 69 parts of the asphalt binder prepared as shown in Example 1 and 31 parts of the aqueous phase obtained as described in the said Example 1 were introduced continuously and simultaneously, via pipes 8 and 9 respectively, into a colloid mill having the same characteristics as that used in Example 1 for the preparation of Emulsion B according to the invention, the binder and the aqueous phase having an overall flow rate of 300 kg/hour and being at temperatures leading to the production of a temperature of 113° C. in the premixing zone 11 and in the shearing zones of the emulsifying chamber (colloid mill). The aqueous emulsion emerging from the colloid mill was treated as described in Example 1 to cool it to room temperature.

The characteristics of Emulsion E obtained are presented in Table III below.

TABLE III

| Emulsion | E |
|---|---|
| Binder content (weight %) | 69 |
| pH | 4.7 |
| Breaking index at 20° C. (g/100 g) | 32 |
| Breaking index at 5° C. (g/100 g) | 37 |
| STV Pseudoviscosity at 25° C. (s) | 123 |
| Mean diameter of the globules (μm) | 4.1 |

As is emphasized from this example, the process according to the invention makes it possible to produce an emulsion containing a low content of asphalt/polymer binder (approximately 69% by weight of binder) whose viscosity is comparable to that of an emulsion containing a high content (approximately 80% by weight) of the same binder, by adjusting the temperature in the emulsifying chamber.

EXAMPLE 4

Preparation of aqueous emulsions of an asphalt binder consisting of an asphalt

Two cationic emulsions, namely a control Emulsion F and an Emulsion G according to the invention, were prepared containing 80% by weight of an asphalt binder consisting of an asphalt having a penetration of 180/220.

Preparation of the aqueous phase:

10 parts of a cationic emulsifying agent marketed under the name of Dinoram S and consisting essentially of fatty diamines were dispersed in 1000 parts of water brought to 60° C., 6.5 parts of 20° Bé HCl were then added to the dispersion obtained and the whole was stirred until a clear liquid was obtained.

Preparation of control Emulsion F:

800 parts of asphalt with a penetration equal to 180/220, brought to a temperature of 169° C., and 200 parts of the aqueous phase at 60° C., prepared as shown above, were introduced continuously, with an overall flow rate of 150 kg/hour, into a conventional colloid mill consisting of a concentric stator and a concentric rotor of frustoconical form having a large diameter equal to 50 mm and an air-gap having a thickness of 0.3 mm. The colloid mill was maintained under pressure to prevent boiling of the water of the medium subjected to emulsification, the temperature of which was approximately 136° C. The rotational speed of the rotor was fixed at 6000 revolutions/minute, which corresponds to a peripheral speed of the rotor of approximately 15.7 m/s.

The emulsion emerging from the colloid mill was then treated as described in Example 1 to cool it to room temperature.

Preparation of Emulsion G according to the invention:

The preparation was carried out in a colloid mill having the characteristics of the colloid mill used to prepare Emulsion B of Example 1.

80 parts of the asphalt with a penetration of 180/220, having a temperature of 173° C., and 20 parts of the aqueous phase obtained as described above were introduced continuously and simultaneously, via the pipes 8 and 9 respectively, into the colloid mill with an overall flow rate of 300 kg/hour. The colloid mill (emulsifying chamber) was maintained under pressure to prevent boiling of the water of the medium subjected to emulsification, the temperature of which was equal to approximately 141° C.

The emulsion emerging from the colloid mill was treated as shown in Example 1 to cool it to room temperature.

The characteristics of Emulsions F and G obtained are given in Table IV.

TABLE IV

| Emulsion | F | G |
|---|---|---|
| Binder content (% by weight) | 80 | 80 |
| pH | 3 | 3.2 |
| Breaking index at 20° C. (g/100 g) | *) | 32 |
| STV Pseudoviscosity at 50° C. (s) | >1000**) | 300 |
| Mean diameter of the globules (μm) | 4 | 22 |

*)measurement impossible due to the excessively high viscosity of the emulsion which does not make it possible to determine the breaking point and solidification point of the granular mixture (sand + binder)

**)even after 30 minutes, no flow takes place; the product seems to behave as a liquid having a flow threshold.

As is emphasized from the results of Table IV, an emulsion containing 80% by weight of a conventional asphalt prepared by a conventional technique has a viscosity which is incompatible with the usual uses, whereas, by resorting to the process according to the invention, it is possible to obtain an emulsion containing the same asphalt content whose viscosity is within the region acceptable for the usual uses.

EXAMPLE 5

Preparation of aqueous emulsions containing variable contents of an asphalt binder consisting of an asphalt Six cationic emulsions were prepared containing variable contents of an asphalt binder consisting of an asphalt having a penetration of 180/220, namely control Emulsions H and L and Emulsions I, J, K and M according to the invention. The aqueous phase used to produce these emulsions was obtained as described in Example 4.

Preparation of control Emulsions H and L:

The preparation was carried out in a conventional colloid mill having the characteristics of the colloid mill used to produce control Emulsion F of Example 4.

Control Emulsion H was formed at atmospheric pressure by introducing, into the colloid mill, 600 parts of asphalt brought to 156° C. and 400 parts of the aqueous phase, with an overall flow rate of 150 kg/hour. The emulsion emerging from the colloid mill was then cooled to room temperature over a period of approximately six hours to avoid any thermal shock.

Control Emulsion L was produced by introducing, into the colloid mill, 700 parts of asphalt brought to 160° C. and 300 parts of the aqueous phase, with an overall flow rate of 150 kg/hour. The emulsifying mill was maintained under pressure to prevent boiling of the water of the medium subjected to emulsification, the medium being at a temperature of 127° C. The emulsion emerging from the colloid mill was treated as shown in Example 1 to cool it to room temperature.

Preparation of Emulsions I, J, K and M according to the invention:

The preparation was carried out in a colloid mill having the characteristics of the colloid mill used to prepare Emulsion B in Example 1.

Emulsion I was formed at atmospheric pressure by introducing, into the colloid mill, 600 parts of the asphalt brought to 105° C., via the pipe 8, and 400 parts of the aqueous phase, via the pipe 9, with an overall flow rate of 300 kg/hour. The emulsion emerging from the colloid mill was then cooled to room temperature over a period of approximately six hours to prevent any thermal shock.

Emulsions J and K were produced by introducing, in the colloid mill, via the pipe 8, 650 parts of the asphalt and, via the pipe 9, 350 parts of the aqueous phase, with an overall flow rate of 300 kg/hour and temperatures such that the medium subjected to emulsification had a temperature of 130° C. for Emulsion J and 105° C. for Emulsion K. The colloid mill was maintained under pressure to prevent boiling of the water of the medium subjected to emulsification. The emulsions emerging from the colloid mill were treated as shown in Example 1 to cool them to room temperature.

Emulsion M was produced by introducing into the colloid mill, via the pipe 8, 700 parts of the asphalt brought to 130° C. and, via the pipe 9, 300 parts of the aqueous phase, with an overall flow rate of 300 kg/hour and a temperature of the aqueous phase such that the medium subjected to emulsification was at a temperature of 110° C. The colloid mill was maintained under pressure to prevent boiling of the water of the medium subjected to emulsification. The emulsion emerging from the colloid mill was treated as shown in Example 1 to cool it to room temperature.

The characteristics of the emulsions obtained are collated in Table V below

TABLE V

| Emulsion | H | I | J | K | L | M |
|---|---|---|---|---|---|---|
| Binder content (% by weight) | 60 | 61 | 65 | 65 | 70 | 71.5 |
| pH | 3 | 3 | 3 | 3 | 3 | 3 |
| Breaking index at 25° C. (g/100 g) | 75 | 75 | 75 | 75 | 75 | 75 |
| STV Pseudo-viscosity at 50° C. (s) | | | 16 | 120 | 15 | 35 |
| Engler viscosity (°E.) | 4 | 12 | | | | |

As is emphasized from the results of Table V, at low asphalt contents, Emulsions I and M according to the invention have respectively greater viscosities than control Emulsions H and L containing comparable asphalt contents.

The results of Table V also reveal that two Emulsions J and K according to the invention containing the same low asphalt content have respective viscosities which depend on the production temperature of the emulsions.

EXAMPLE 6

Preparation of an aqueous emulsion from an asphalt-/polymer asphalt binder having a high viscosity A cationic Emulsion P was prepared containing 70% by weight of an asphalt binder of the asphalt/polymer type consisting of the product of the reaction of an asphalt, with a penetration equal to 67, with a disequenced styrene and butadiene copolymer, containing 25% by weight of styrene and having a viscosimetric mean molecular mass equal to approximately 75,000, in the presence of a coupling agent consisting of elemental sulphur.

Preparation of the asphalt binder:

By carrying out the preparation at 170° C. and with stirring, 964 parts of the asphalt were mixed with 35 parts of disequenced copolymer. After mixing for 3 hours with stirring, a homogeneous mass was obtained. 1 part of crystalline sulphur was then added to this mass, maintained at 170° C., and then the whole was stirred for a further 60 minutes to form an asphalt-/polymer asphalt binder.

The asphalt binder thus produced had the following characteristics:

Viscosity (Pa.s): 8.5
Ring and Ball Temperature (°C.): 60
Penetration (1/10 mm): 52
Fraas point (°C.): −18
Tensile test at 5° C. with a speed of 500 mm/minute
Threshold stress ($\overline{V}t$) (Pa): $20\times10^5$ Pa
Breaking stress ($\overline{V}b$) (Pa): $5.6\times10^5$ Pa
Elongation at breaking ($\epsilon b$) (%): >900

Preparation of the aqueous phase:

20 parts of a cationic emulsifying agent marketed under the name of Dinoram S and consisting essentially of fatty diamines were dispersed in 1000 parts of water brought to 60° C., 13 parts of 20°Bé concentrated HCl were then added to the dispersion obtained and the whole was stirred until a clear liquid was obtained.

Preparation of Emulsion P according to the invention:

The preparation was carried out in a colloid mill having the characteristics of the colloid mill used to prepare Emulsion B of Example 1.

700 parts of the asphalt binder prepared as shown above and brought to 156° C. and 300 parts of the aqueous phase defined above were introduced continuously and simultaneously, via the pipes 8 and 9 respectively, into the colloid mill with an overall flow rate of 300 kg/hour, the medium subjected to emulsification being at a temperature of 122° C. The colloid mill was maintained under pressure to avoid boiling of the water of the medium subjected to emulsification. The emulsion emerging from the colloid mill was treated as shown in Example 1 to cool it to room temperature.

The characteristics of Emulsion P obtained are presented in Table VI.

TABLE VI

| Emulsion | P |
|---|---|
| Binder content (% by weight) | 70 |
| pH | 3 |
| Breaking index at 20° C. (g/100 g) | 100 |
| STV Pseudoviscosity at 25° C. (s) | 115 |
| Mean diameter of the globules (μm) | 3 |

Examination of the values which appear in Table VI reveals that, with a binder of very high viscosity, the process according to the invention makes it possible to produce an aqueous emulsion whose properties, especially viscosity, are compatible with a road use.

An emulsion containing the same binder content prepared, by resorting to a conventional colloid mill, from the abovementioned asphalt/polymer binder and aqueous phase would have been unusable for a road use as it has a very high instability.

We claim:

1. A process for the production of an aqueous asphalt binder emulsion with controlled viscosity and breaking properties which comprises: introducing a molten asphalt binder at a temperature of from 80° C. to 180° C. and an aqueous phase, containing at least a portion of an emulsifying system and optionally a pH adjusting agent, at a temperature of from 10° C. to 90° C. into an emulsifying zone (1) comprising an inlet (6) and an outlet (10) separated by a series (28 to 33) of rotor/stator shearing zones arranged in series each comprising at least one circular groove (28 to 33) formed in one face (19 to 24) of a stationary stator element (15 to 17), rigidly connected to the wall (2) of the zone (1) into which circular groove enters a series of rotor projections (37 to 42), each having, in cross-section through a plane containing the axis (18) of the groove, a shape complementary to that of the corresponding cross-section of the groove, so as to define, between each projection and the groove, a space forming a gap, the projections being rigidly connected to one of the faces of a rotor support disc (47 to 50) centered on the axis (18) of the groove and rotationally mobile around the axis, which disc is traversed by orifices (51 to 54) arranged between the axis of the groove and the projections, the grooves of two consecutive shearing zones being arranged so as to be either formed in the opposite faces (21,22) of the same stator element (16) and connected via channels (35) connecting their respective bottoms, or formed in the facing faces (22, 23) of two consecutive stator elements (16, 17) and separated by a rotor support disc (49) carrying projections (40, 41) on its two faces, the process being characterized in that there is injected into the emulsifying enclosure, via its inlet, an asphalt binder (8) in the form of a molten mass having a temperature between 80° C. and 180° C., and an aqueous phase (9), which contains an emulsifying system or at least one of its components, the remainder of the emulsifying system then being present in the asphalt binder, and optionally an agent for adjusting the pH of the emulsion and which has a temperature between 10° C. and 90° C., wherein the combined asphalt binder and aqueous phase pass into the successive shearing zones having air-gaps with a width of from 0.1 mm to 5 mm, by imposing a rotational speed on the rotor discs carrying the projections such that their peripheral speed is between 4 and 18 m/s.

2. The process of claim 1, wherein the asphalt binder and the aqueous phase are premixed (11) before passing into the first shearing zone (28) of the emulsifying zone (1).

3. The process of claim 1, wherein a weight ratio of asphalt binder to aqueous phase used to form the emulsion introduced into the emulsifying zone, is from 50:50 to 90:10.

4. The process of claim 1, wherein the channels (35) connecting the respective bottoms of the consecutive grooves (30, 31), which are formed in the opposite faces (21, 22) of the same stator element (16), have a cross-section with a surface area greater than those of the orifices (52, 53) passing through the disc carrying projections (48, 49) associated with each groove (30, 31).

5. The process of claim 1, wherein the viscosity of the emulsion containing a given concentration of asphalt binder produced in the emulsifying zone (1) is controlled by the temperature of the asphalt binder and the aqueous phase, or their premixture, at the inlet of the emulsifying zone, the viscosity of the emulsion being higher, all other conditions being equal, as the inlet temperature is lower.

6. The process of claim 1, wherein the asphalt binder introduced into the emulsifying zone has a kinematic viscosity at 100° C. between $0.5\times10^{-4}$ $m^2/s$ and $3\times10^{-2}$ $m^2/s$.

7. The process of claim 1, wherein the asphalt binder comprises at least one material selected from the group consisting of asphalt, a mixture of asphalts, a mixture at least one asphalt product and at least one polymer, and a mixture of at least one asphalt product and at least one polymer modified by the reaction of said mixture with a coupling agent selected from the group consisting of elemental sulphur, polysulphides or hydrocarbons, sulphur-donating vulcanization accelerators, non-sulphur-donating vulcanization accelerators and mixtures thereof.

8. The process of claim 7, wherein the asphalt binder is the mixture of at least one asphalt product and at least one polymer, wherein the polymer comprises 0.5% to 15% by weight of the asphalt associated with the polymer.

9. The process of claim 7, wherein the asphalt binder is a mixture of at least one asphalt product and at least one polymer in which the polymer is a statistical or sequenced copolymer of styrene and a conjugated diene, the conjugated diene, the conjugated diene comprising at least one member selected from the group consisting of butadiene, isoprene, chloroprene, carboxylated butadiene and carboxylated isoprene.

10. The process of claim 9, wherein the copolymer contains 5% to 50% by weight of styrene.

11. The process of claim 7, wherein immediately before mixture of at least one asphalt product and at least one polymer is brought into contact with the aqueous phase, a sulphur-donating vulcanization system is added to said mixture an amount of sulphur of from 0.5 to 20%, of the weight of the polymer present in the said mixture.

12. The process of claim 1, wherein the aqueous phase contains an amount of emulsifying system of from 0.05% to 5%, of the total weight of the emulsion formed.

13. The process of claim 1, wherein the asphalt binder is at a temperature which when mixed with the aqueous phase, provides a mixture at a temperature greater than the boiling temperature of the water and the emulsifying zone is operated at a pressure sufficient to prevent boiling of the water.

14. The process of claim 1, wherein each of the faces (21, 22) of the stator elements (15 to 17) is provided with two concentric grooves (55, 56 and 57, 58) so that, to each groove (55 or 56) present on one (21) of the faces (21, 22) of the stator element (16), there is a corresponding identical groove (57 or 58) on the opposite, face (22) of the element (16), the corresponding grooves being connected, bottom to bottom, by channels (59 or 60) formed in the stator element and each face of any disc (48), which faces a doubly-grooved face (21) of a stator element (16), carries two concentric series (62, 61) of projections, such that the projections of a series (61 or 62) enter into one (55 or 56) of the grooves of the doubly-grooved face (21) so as to define, with this groove, a gap.

15. A method of forming a sealing coat on a surface which comprises applying to the surface the aqueous emulsion of claim 1.

16. The process of claim 1, wherein the asphalt binder introduced into the process is at a temperature of from 110° C. to 160° C.

17. The process of claim 1, wherein the aqueous phase introduced into the process is at a temperature of from 20° C. to 80° C.

18. The process of claim 3, wherein the weight ratio of asphalt binder to aqueous phase is from 55:45 to 85:15.

19. The process of claim 6, wherein the asphalt binder has a kinematic viscosity of from $1\times10^{-4}$ $m^2/s$ to $2\times10^{-2}$ $m^2/s$.

20. The process of claim 8, wherein the polymer comprises from 0.7 to 10% by weight of the asphalt associated with the polymer.

21. The process of claim 11, wherein the amount of sulphur is from 1 to 15% by weight of the polymer composition.

22. The process of claim 12, wherein the aqueous phase contains from 0.1 to 2.0% by weight of the emulsion formed.

* * * * *